United States Patent

Dann

[15] 3,697,673

[45] Oct. 10, 1972

[54] APPARATUS FOR CORRECTING ANGULAR ERRORS IN COLOR VIDEO SIGNALS

[72] Inventor: Bert H. Dann, Mountain View, Calif.

[73] Assignee: Bell & Howell Company, Chicago, Ill.

[22] Filed: Nov. 3, 1969

[21] Appl. No.: 873,284

[52] U.S. Cl. ....178/5.4 CD, 178/6.6 TC, 179/100.2 S

[51] Int. Cl. ..............................................H04n 5/78

[58] Field of Search ....178/5.4 CD, 69.5 CB, 6.6 TC; 179/100.2 MI, 100.2 S; 325/419

[56] References Cited

UNITED STATES PATENTS

| | | | |
|---|---|---|---|
| 3,018,324 | 1/1962 | Leyton et al. | 178/5.4 CR |
| 3,433,903 | 3/1969 | Murray et al. | 179/100.2 MI |
| 3,488,452 | 1/1970 | Gunning et al. | 179/100.2 S |
| 3,506,777 | 4/1970 | Carlson | 178/5.4 CR |
| 3,371,281 | 2/1968 | Powell | 325/419 |
| 3,517,266 | 6/1970 | Webb | 325/419 |

*Primary Examiner*—Robert L. Griffin
*Assistant Examiner*—Donald E. Stout
*Attorney*—Luc P. Benoit

[57] ABSTRACT

Apparatus for correcting effects of angular errors in a color video signal accompanied by a reference signal processes such color video signal and reference signal to dispose modulation components of the color video signal about a substantially stable carrier while substantially retaining phase and amplitude interrelationships of these modulation components. The processed reference signal is separated from the processed color video signal and an error signal indicative of angular errors in the processed color video signal is derived from the separated processed reference signal. The above mentioned processing is controlled in response to the latter error signal to correct effects of said angular errors.

18 Claims, 2 Drawing Figures

INVENTOR.
BERT H. DANN
BY
ATTORNEY

INVENTOR.
BERT H. DANN
BY [signature]
ATTORNEY

APPARATUS FOR CORRECTING ANGULAR ERRORS IN COLOR VIDEO SIGNALS

CROSS-REFERENCES TO RELATED APPLICATIONS

U.S. Patent application, Ser. No. 872,847 now U.S Pat. No. 3,629,491,, filed Oct. 31, 1969, by Bert H. Dann, and assigned to the subject assignee;

Patent application, Ser. No. 872,848,, filed Oct. 31, 1969 now U.S. Pat. No. 3,634,616, by Bert H. Dann, and assigned to the subject assignee;

Patent application, Ser. No. 56,787,, filed July 21, 1970, by Bert H. Dann, and assigned to the subject assignee;

Patent application, Ser. No. 873,416,, filed Nov. 3, 1969, by Bert H. Dann and Floyd M. Gardner, and assigned to the subject assignee.

BACKGROUND OF THE INVENTION

1. Field of the Invention

The subject invention relates to signal processing systems and, more particularly, to apparatus for correcting effects of angular errors in color video signals.

2. Description of the Prior Art

The desire to improve methods and apparatus for correcting effects of angular errors in color video signals is of long standing and is receiving renewed impetus from the advent of color video tape recording systems.

Briefly stated, a composite color video signal comprises a luminance component and a chrominance component. The latter includes phase and amplitude modulated components disposed about a suppressed subcarrier which, in the NTSC system, nominally oscillates at 455 times half-line frequency or at approximately 3.58 MHz. In certain low-cost industrial systems, the latter half-line frequency factor is not necessarily observed, although the nominal line-scan and color-subcarrier frequencies correspond very closely to those of the NTSC system.

If a composite color video signal is recorded on and reproduced from magnetic tape, to name an example, factors such as flutter and wow in the recording and playback processes, tape shrinking and elongation, and head-to-tape spacing irregularities produce angular variations in the reproduced video signal.

Such angular errors in the luminance component are generally tolerated by the eye, particularly if they are kept within sensible limits by the use of adequate recording and playback machines. By contrast, the above mentioned nature of the chrominance component makes this component particularly vulnerable to angular errors, as is easily seen from the fact that the phase-modulated component in the chrominance signal contains color hue information and that the eye is particularly sensitive to hue aberrations. Moreover, a shift in average frequency in the color reference carrier rate of the played-back video signal of typically more than about ± 100 to 200 Hz exceeds the pull-in range of the color-reference synchronization circuits of typical color monitors or color television receivers employed for viewing the played-back signal. This at least results in a complete random display of colors. In the vast majority of color television receiving sets, no color at all will, however, be displayed since the lack of color reference synchronization prevents the conventionally employed chroma gating or "color killer" circuits from enabling the color circuits of the set.

In an effort to counter these detrimental effects, the use of variable time delay devices for correcting time base errors in the reproduced signal has been proposed. These devices, however, are costly and introduce substantial complexities into the playback system. Moreover, their range of operation is typically limited, so that their use presupposes a preliminary error correction and the availability of high-precision recording and playback machines.

According to a more practical proposal, the degraded chrominance portion of the reproduced video signal is decoded into separate color components by means of a reference signal which reflects angular errors in the video signal and which is either derived from one or more pilot signals recorded and reproduced with the video signal, or from the color synchronizing signal or "color bursts" contained in the reproduced chroma signal.

In these systems, a certain measure of correction is realized from the fact that the decoding reference signal is affected with practically the same angular errors as the played-back chrominance signals.

Typically, the decoded color components are reconstituted on a stable carrier by means of a color encoder driven by a locally generated subcarrier. In theory, it would be possible to omit the latter encoding process and to apply the demodulated color components directly to the television set employed for viewing the played-back video program. This, however, would require direct access to the internal circuitry of the set, whereas the general endeavor moves in the direction of providing recording and playback equipment that does not require major intrusions into the viewing set circuitry.

Accordingly, both the above mentioned decoding and encoding stages and processes are generally required. This being the case, the prior art proposal under consideration in effect proceeds to the extent of breaking the color signal down into different color components just for the purpose of correcting angular errors therein. Such a drastic procedure is generally disadvantageous, since it implies too many sources of potential error which may further degrade the color signal.

A different approach is apparent from another proposal according to which the played-back color signal is heterodyned with a locally produced stable signal of a first frequency, while an error signal reflecting the degradation of the color signal is heterodyned with a locally produced stable signal of a second frequency. It can be seen that these heterodyning and subsequent sideband selecting operations produce two signals, each of which is afflicted with angular errors of the played-back color signal. Accordingly, it is possible to eliminate the effect of such errors by heterodyning the latter two signals with each other and selecting the difference-frequency component from the result of this heterodyning step.

By an appropriate selection of the respective frequencies of the signals participating in the heterodyning processes, the modulation components of the resulting color signal can be made to be disposed about a stable carrier of standard color subcarrier frequency.

While this proposal alleviates the above mentioned disadvantages of the previously discussed decoding-encoder system, its practical realization results in a complex arrangement including a plurality of modulators, filters and frequency translators which participate directly in the signal processing operation and must thus meet rather high standards.

In consequence, recent activities in the subject area have primarily been characterized by a proliferation of color-component decoding systems of the initially mentioned type.

SUMMARY OF THE INVENTION

The subject invention overcomes or materially checks the above mentioned disadvantages and, from one aspect thereof, provides apparatus for correcting effects of angular errors in a chrominance video signal accompanied by a reference signal. This apparatus comprises, in combination, means for processing such chrominance video signal including said reference signal to dispose modulation components of the chrominance video signal about a substantially stable carrier while substantially retaining phase and amplitude interrelationships of these modulation components, means connected to the processing means for separating the processed reference signal from the processed chrominance signal, means connected to the separating means for deriving from the separated processed reference signal an error signal indicative of angular errors in the processed chrominance video signal, and means connected to the processing means for controlling the above mentioned processing means in response to the latter error signal to correct effects of said angular errors.

As this description proceeds, it will be recognized that the invention inherent in this apparatus materially improves and simplifies signal processing operations of the type here under consideration and also enables the utilization of self-correcting servo principles.

From another aspect thereof, the invention provides apparatus for correcting effects of angular errors in a chrominance video signal accompanied by a reference signal affected by said angular errors, comprising phase-lock loop means having input means for receiving the chrominance video signal and the reference signal, and output means, and including in combination, means connected between the named input means and output means for processing the chrominance video signal including the reference signal to dispose modulation components of such chrominance video signal about a substantially stable carrier while substantially retaining phase and amplitude interrelationships of such modulation components, means for applying the processed chromium video signal to said output means, means connected to the named processing means for separating the processed reference signal from the processed chrominance video signal, means connected to the separating means for deriving from the separated processed reference signal an error signal indicative of angular errors in the processed chrominance video signal, and means connected between the error signal-deriving means and the named processing means for controlling such processing means in response to the mentioned error signal to correct effects of said angular errors.

From yet another aspect thereof the invention provides apparatus for correcting effects of angular errors in a video signal including luminance information and chrominance information accompanied by a reference signal affected by said angular errors, comprising means for deriving from the video signal and said reference signal a first signal component including liminance information within a first frequency spectrum, and a second signal component including chrominance information and luminance information within a second frequency spectrum and including said reference signal, and means for processing the second signal component including said reference signal to dispose modulation components including the mentioned chrominance information and luminance information in the second signal component about a substantially stable carrier.

This apparatus further includes means connected to said processing means for separating the processed reference signal from the processed chrominance and luminance information, means connected to the separating means for deriving from the separated processed reference signal an error signal indicative of angular errors in the processed video signal component, means connected to said processing means for controlling the processing means in response to the error signal to correct effects of said angular errors, and means for recombining the first video signal component and the processed second video signal component into a composite video signal.

BRIEF DESCRIPTION OF THE DRAWINGS

The invention will become more readily apparent from the following detailed description of preferred embodiments thereof, illustrated by way of example in the accompanying drawings, in which.

DESCRIPTION OF THE PREFERRED EMBODIMENTS

Figure 1:
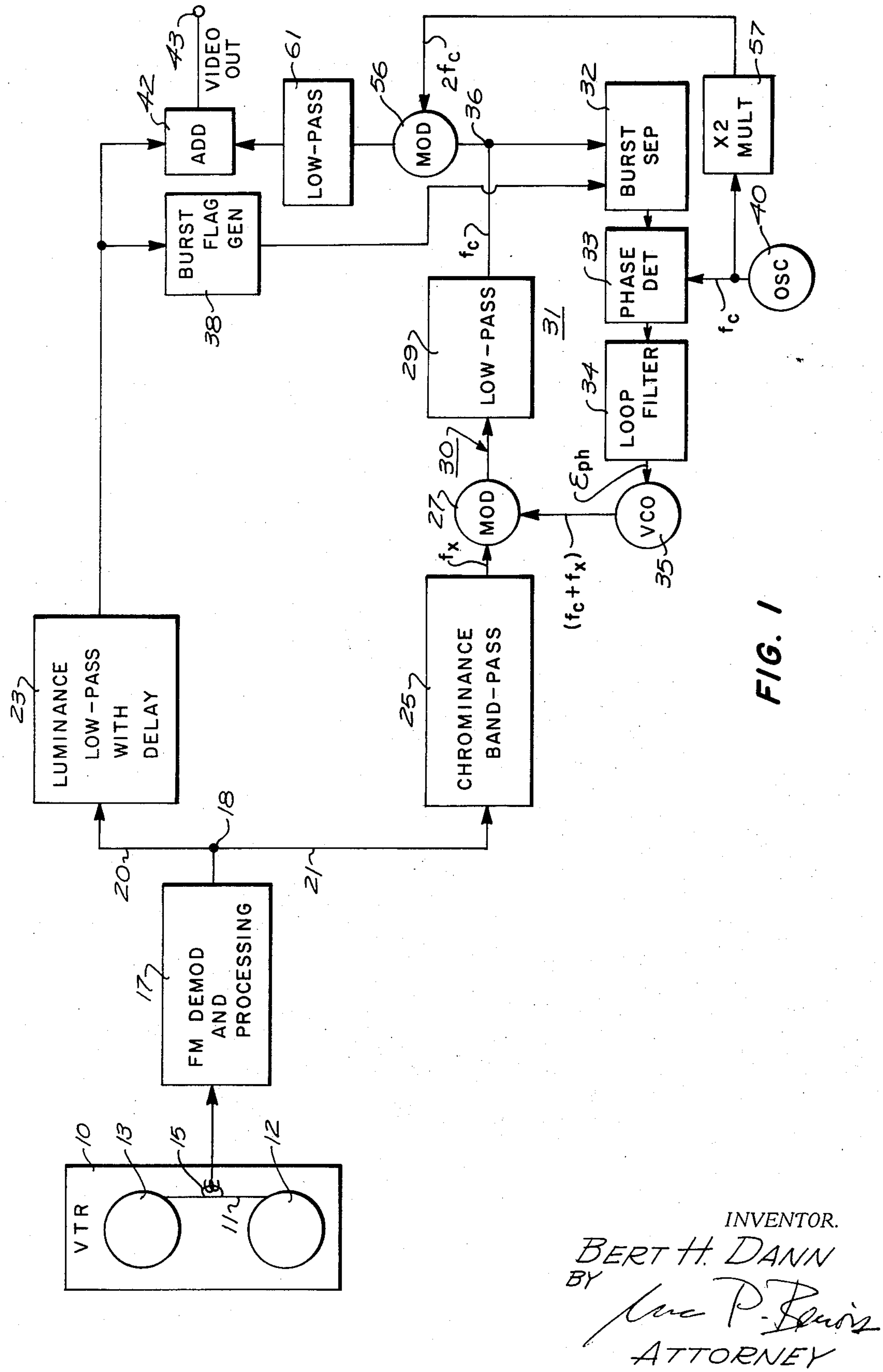
FIG. 1 is a block diagram of a signal correcting apparatus in accordance with a first preferred embodiment of the subject invention.

FIG. 1 symbolically shows a video tape recording apparatus 10 on which a magnetic recording tape 11 is wound from a reel 12 onto a reel 13 by means of conventional machinery (not shown). A color video signal recorded on the tape 11 is reproduced by means of playback head 15.

In practice, it is customary to keep the required velocity of the tape 11 within feasible limits by having the playback head 15, or a plurality of playback heads, execute a transverse or slant-track scan relative to the tape 11. Means for accomplishing these and other advantageous scanning patterns are well known in the art and are thus not illustrated herein.

It is also generally known to be advantageous to subject composite video signals to a selected modulation prior to the recording thereof so as to improve the quality of the reproduced video signal. So far, frequency modulation has been most widely used for this purpose, but nothing mentioned or indicated herein is intended to preclude the use of any other suitable kind of modulation.

The signal played back by means of the head 15 is applied to a processing stage 17 which includes amplifier, demodulator and related means of the type customarily employed to render a reproduced composite video signal suitable for further processing. It should be understood in this connection that the demodulator in block 17 does not resolve the composite video signal into its components, but rather demodulates such signal from the FM carrier or other modulation used for recording purposes as mentioned above.

The reproduced composite video signal, demodulated from the above mentioned recording carrier or modulation, is applied to a point 18 connected to two branches 20 and 21. The branch 20 may be termed the "luminance branch" while the branch 21 may be viewed as a "chrominance branch."

As suggested by this terminology, the branch 20 includes low-pass filter means 23 which extract the luminance component from the composite video signal, or at least a major portion of such luminance component. By way of example, the low-pass filter means included in block 23 may have a cutoff frequency of about 3MHz. The block 23 may also include time delay means which compensate in a conventional manner for delays occurring in the chrominance branch 21.

The branch 21 includes filter means 25 which extract the chrominance component, or at least a major portion of such component, from the composite video signal occurring at point 18. By way of example, the filter means 25 may include a bandpass filter having a range of about 1MHz between about 3 MHz and 4 MHz. If desired, the filter means 25 may alternatively include high-pass filter means having a lower cutoff frequency of about 3MHz. In practice, the choice of a high-pass filter in lieu of bandpass filter means may be more advantageous, since relative phase-versus-frequency shifts in the two branches 20 and 21 are reduced if the filter means 23 and 25 are of a complementary type. Also, the advantageous possibility arises that the expensive delay line in block 23 may be replaced by simple replicas of the filters 29 and 61 in the chrominance branch 21. The fact that a high-pass filter generally does not cut off frequencies above the band here of interest is not generally detrimental, as long as the recorder 10 displays itself a limited bandwidth.

The extracted color signal is applied to a mixer or modulator 27. It will be realized in this connection that factors such as flutter and wow in the recording and playback processes, shrinking and elongations of the tape 11, and spacing irregularities between the recording head and the tape or the playback head 15 and the tape 11, manifest themselves in the form of angular degradations in the chrominance signal applied to the modulator 27. These degradations, to the extent they are of relevance to the subject discussion, are herein broadly referred to as angular errors.

For present purposes, the frequency or phase of the suppressed carrier of the degraded color signal is designated as $f_x$ which may be defined as $$f_x = f_r (1 + \Delta)$$

wherein $f_r$ is the standard color subcarrier frequency (approximately 3.58 MHz in the NTSC system) which prevailed at the time of recording, while $\Delta$ designates angular errors (typically time varying) in the played-back signal.

In addition to the chrominance signal having the suppressed carrier $f_x$, a reference signal composed of $(f_c + f_x)$ is applied to a second input of the modulator 27, wherein $f_c$ is a locally generated stable reference signal of frequency equal to the standard NTSC color reference carrier frequency (approximately 3.58 MHz). This modulator heterodynes the signal $(f_c + f_x)$ with the signal $f_x$. Among the products of such heterodyning or modulation step, there is a component which represents the frequency difference between the latter two signals. A low-pass filter 29 extracts such frequency-difference component from the output of the modulator 27.

If the $f_x$ term in the $(f_c + f_x)$ reference signal corresponds in frequency exactly to $f_r$ (1 +$\Delta$), then the latter frequency-difference component just mentioned will be at the frequency $f_c$. Fixed or slowly varying phase discrepancies between the $f_x$ term in the $(f_c + f_x)$ reference signal and the $f_x$ input of the modulator will generally not result in improper system operation, since the relative phase of the color reference burst and the modulated chrominance information will be preserved.

It is understood in this connection that the stable carrier $f_c$ itself is suppressed in accordance with standard practice. In the instant apparatus, this carrier suppression is effected in the modulator 27. This modulator preferably is of a doubly balanced type to assure adequate suppression of components disposed about $f_x$. The nature, construction and operation of doubly balanced modulators are well known in the electronics art.

The generation of the above mentioned $(f_c + f_x)$ reference signal will now be described. In the illustrated embodiment, this reference signal is generated in a phase-lock servo loop 31 which includes a burst separator 32, a phase detector 33, a loop filter 34, a voltage-controlled oscillator 35, and the above mentioned modulator 27 and the low-pass filter 29 included in the signal processing means 30.

The burst separator 32 may be of a conventional type and is gated by a burst flag generator 38 which responds to the horizontal synchronization pulses occurring at the output of the low-pass filter 23 in the luminance branch 20. The burst separator 32 derives color synchronization or color burst signals from the chrominance signal which has been processed by the processing means 30 and which appears at the output 36 of the low-pass filter 29. This derived burst information is applied to one input of a phase detector 33 which compares the phase of the derived burst information with that of a stable reference signal which is produced by a local oscillator 40 and which preferably oscillates at the above mentioned nominal frequency $f_c$.

Angular errors in the processed chrominance signal passing through the low-pass filter 29 will also affect the burst information present therein, so that the phase detector 33 will produce a phase error signal $\epsilon_{ph}$ which is applied to the control input of the voltage-controlled oscillator 35. In accordance with conventional practice, the servo loop 31 includes a loop filter 34 which imposes a desired measure of stability on the loop and dampens hunting tendencies and objectionable discontinuities.

The voltage-controlled oscillator 35 is constructed to provide the modulator 27 which the reference signal of a frequency of $(f_c + f_x)$ and varying in phase in response to the error signal $\epsilon_{ph}$ so as to follow angular error variations of the color bursts in the processed signal at the output 36 of the low-pass filter 29. Since the servo loop 31 extends through the signal output 36 and the modulator 27, it is easily seen that it provides an automatically operating error correction function which closely follows error variations in the played-back color video signal applied through the point 18 and the filter 25 to the modulator 27. This is also apparent if the burst separator 32, phase detector 33 and loop filter 34 are considered as being connected in a feedback path for the signal processing means 30.

A modulator 56 is connected to the output 36 of the filter 29 and serves to reestablish the correct angular relationship between the burst and other chrominance vectors which was reversed by the heterodyning process in modulator 27. The modulator 56 is driven by a reference signal of $2f_c$ which is provided by a factor-of-two multiplier 57 connected to the oscillator 40. A low-pass filter 61 is connected to the output of the modulator 56 to extract the lower frequency component $(2f_c\text{-}f_c)=f_c$ from the modulation product. The component extracted by the filter 61 may be viewed as a chrominance signal the modulation components of which are disposed about a substantially stable carrier, while phase and amplitude interrelationships of such modulation components are retained.

At this juncture, it will be understood that the principles disclosed herein are not confined in application to systems in which an angular-error signal is derived from color burst information. Rather, such error signal may alternatively be derived from, say, a pilot signal recorded with and included in the spectrum admitted by the filter 25 and processed by the means 30 including the modulator 27.

An adding network or amplifier 42 recombines the luminance component from the block 23 and the processed chrominance signal from the output of the modulator 56 and low-pass filter 61 to provide a composite color video signal at the system output 43.

This composite video signal may then be utilized in a conventional manner, such as by application to suitable color television receiver circuits. If desired, the composite video signal at the output 43 may be modulated on a carrier for the application thereof to antenna terminals or another easily accessible part of a television receiving set.

Figure 2:
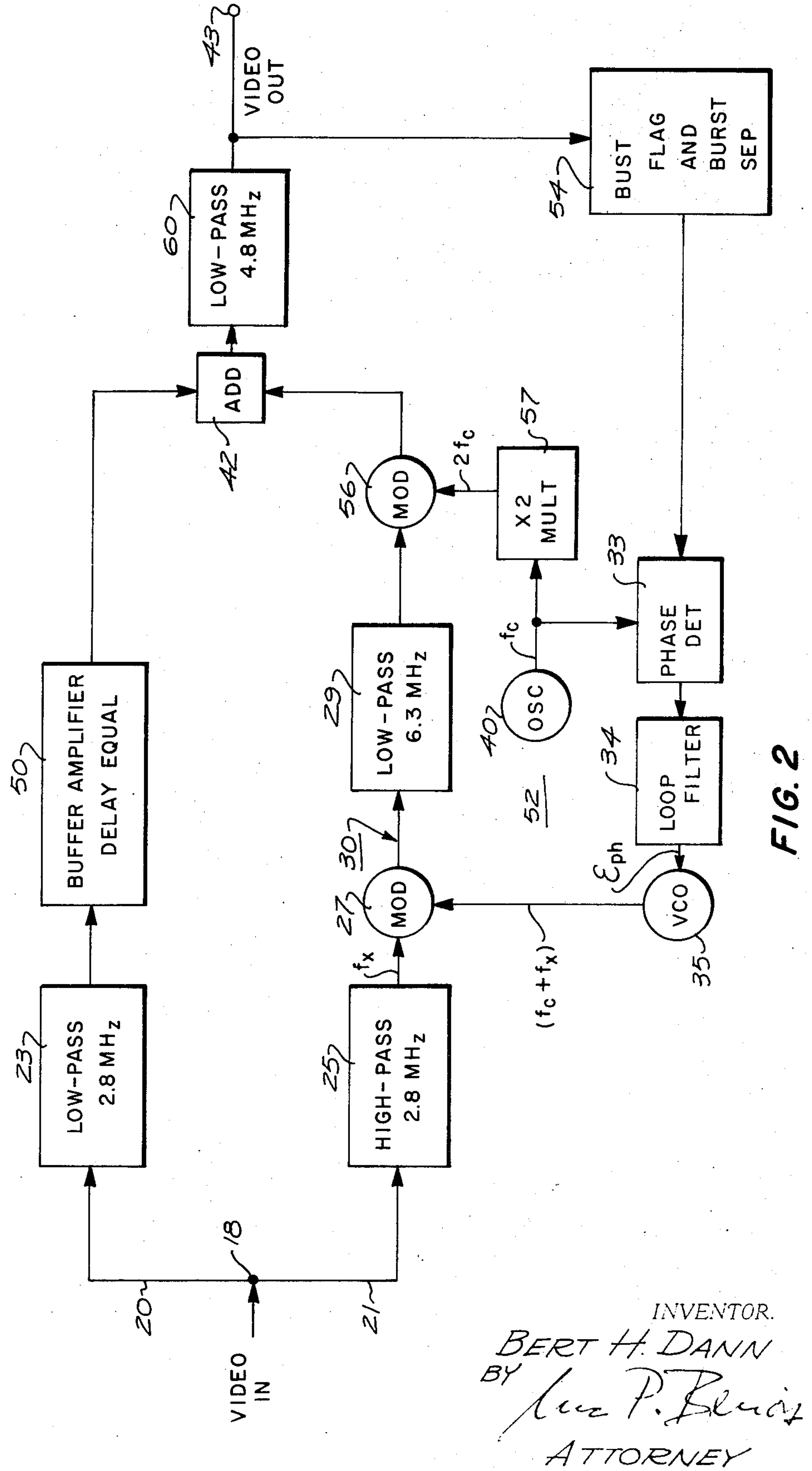
FIG. 2 is a block diagram of a signal correcting apparatus in accordance with a second preferred embodiment of the subject invention.

FIG. 2 illustrates a remodulation system in which luminance components at the upper part of the luminance spectrum, say, at above 2.8 MHz, are processed along with chrominance components and thus retained. This type of processing is important in high quality systems, as will be appreciated from the fact that the higher luminance components represent details of resolution. The luminance extraction filter in the luminance branch 20 generally has to be designed so as to preclude the intrusion of uncorrected color components into the system output product. In general, this means that the latter filter has to be designed so as to cut off an upper portion of the luminance signal. Ordinarily this results in a loss of high-resolution parts of the luminance signal.

Since the embodiment of FIG. 2 is similar to that of FIG. 1, like parts as among these figures are designated by like reference numerals, and the description of FIG. 1 may be consulted for a fuller understanding of such parts. To avoid repetition, the video tape recorder 10 and demodulator 17 ahead of the terminal 18 have not again been shown in FIG. 2.

In accordance with FIG. 2, the luminance signal extraction filter 23 in the luminance branch 20 is designed to have its cutoff in the vicinity and preferably just below the lowest equiband chrominance-sideband frequency. By way of example, the cutoff frequency of this low-pass filter 23 was indicated in FIG. 2 as being 2.8 MHz.

The chrominance extraction filter 25 in the chrominance branch 21 is preferably complementary to the filter 23 in the luminance branch 20. By way of example, filter 25 may be a high-pass filter having a lower cutoff frequency equal to that of the cutoff frequency of the filter 23, or 2.8 MHz.

The luminance branch 20 includes buffer amplifier and delay equalizing means 50 connected to the filter 23. The delay equalization provided thereby is primarily intended to compensate for the delay imposed by the low-pass filter 29 in the signal processing means 30. Since the filter 29 has a relatively high cutoff frequency of, say, 6.3 MHz, the delay equalization in block 50 may conveniently be effected by incorporating therein a low-pass filter which is a replica of the filter 29.

The use of complementary filters in the branches 20 and 21 has the significant advantage of equalizing relative phase-versus-frequency shifts and enabling elimination of an expensive time delay line as mentioned above.

The chrominance and high-luminance branch 21 of the system of FIG. 2 has associated therewith a phase-locked loop 52 which is similar to the servo loop 31 illustrated in FIG. 1. By way of comparison, the burst flag generator and burst separator means 54, which correspond to the burst separator 32 and burst flag generator 38 in the system of FIG. 1, extract the processed color synchronization bursts or reference signal containing the angular error information from the recombined composite video signal applied to the system output 43. As before, this error information is applied to the phase detector 33 which provides, through the previously described loop filter 34, a phase error signal $\epsilon_{ph}$ with the aid of a stable reference signal provided by the local oscillator 40.

The voltage-controlled oscillator 35 again utilizes this error signal $\epsilon_{ph}$ to produce the above mentioned reference signal $(f_c+f_x)$ for the modulator 27 which, in the case of FIG. 1, disposes modulation components of the chrominance signal, as well as of upper frequency portions of the luminance signal, about a substantially stable subcarrier of $f_c$ frequency. As before, the low-pass filter 29 extracts the frequency spectrum of interest from the output of the modulator 27.

In such extracted spectrum, the high-frequency luminance component, which may briefly be designated as $f_h$, is translated to a frequency of $(f_c+f_x)-f_h$ and thus appears as a spurious upper chrominance sideband. A modulator 56 is connected to the output of the low-pass filter 29 and is operated by a reference frequency equal to $2f_c$. The reference frequency of $2f_c$ is provided by multiplier means 57 which double the local oscillator frequency $f_c$. As explained in connection with FIG. 1, the modulator 56 serves to reestablish the correct angular relationships between the burst and other chrominance vectors. In addition, the modulator 56 inverts the high-frequency luminance sideband just mentioned and thus preserves the information contained in that sideband.

The operation of the modulator 56 has no substantial effect on the frequency $f_c$ of the color bursts, since a subtraction of $f_c$ from the reference of $2f_c$ leaves the desired frequency of $f_c$.

As before, an adding network or amplifier 42 recombines the signals provided by the luminance branch 20 and the processed signals supplied by the chrominance and high-luminance signal processing means 30 to a composite video signal which is applied to the system output 43 through a low-pass filter 60 which, by way of example, may have a cutoff frequency of about 4.8 MHz to suppress spurious sidebands.

By effecting the filtering in block 60 after the addition in block 42, the filter in block 60 is precluded from introducing a relative time delay into the chrominance branch 21.

Conversely, the low-pass filter 60 in FIG. 2 could be inserted between the modulator 56 and the adding network 42, whereupon the output of the adding network 42 may be connected directly to the system output 43. Also, the burst separator in block 54 could be connected to the output of the filter 29 to derive the required color burst information therefrom. If the filter 60 is connected between the modulator 56 and the adding network 42, then the latter burst separator may for example be connected to a point between such filter and such adding network to derive the required burst information therefrom. Accordingly, the various statements contained herein according to which a processed reference signal or processed color synchronization bursts are separated from the processed chrominance video signal or from the processed chrominance and luminance information are not limited to situations in which the processed reference signal or processed color synchronization bursts are separated from the particular chrominance signal or chrominance and luminance information upon completed processing thereof, but are intended to be broad enough to cover situations in which a reference signal or color synchronization bursts are separated from the particular chrominance signal or chrominance and luminance information after some processing thereof has taken place (such as by the modulator 37 and filter 29) but before the processing of such signal or information has been completed.

While specific embodiments and modifications have been disclosed, other embodiments and modifications will be apparent or suggest themselves to those skilled in the art.

I claim:

1. Apparatus for correcting effects of angular errors in a chrominance video signal accompanied by a reference signal affected by said angular errors, comprising in combination:

means for processing said chrominance video signal including said reference signal to dispose modulation components of said chrominance video signal about a substantially stable carrier while substantially retaining phase and amplitude interrelationships of said modulation components;

means connected to said processing means for separating the processed reference signal from the processed chrominance video signal;

means connected to said separating means for deriving from said separated processed reference signal an error signal indicative of angular errors in said processed chrominance video signal; and means connected to said processing means for controlling said processing means in response to said error signal to correct effects of said angular errors.

2. Apparatus as claimed in claim 1, wherein said reference signal comprises color synchronization bursts, and wherein:

said signal processing means are constructed to process said chrominance video signal including said color synchronization bursts;

said separating means include means for separating the precessed color synchronization bursts from the processed chrominance video signal; and said error signal-deriving means include means for deriving said error signal from said separated processed color synchronization bursts in said processed chrominance video signal.

3. Apparatus as claimed in claim 1, wherein at least part of each of said signal processing means, said separating means, said error signal-deriving means, and said controlling means are included in phase-lock loop means.

4. Apparatus as claimed in claim 1, wherein said processing means include modulator means.

5. Apparatus as claimed in claim 4, wherein said modulator means are of a balanced type.

6. Apparatus as claimed in claim 1, wherein:

said processing means include modulator means driven by a further reference signal;

said error signal-deriving means include means for providing a stable signal and means for providing said error signal from a comparison of said separated processed reference signal and said stable signal; and said means for controlling said processing means include phase-controlled reference generator means connected to said modulator means and said error signal-deriving means for providing said further reference signal and for varying the phase of said further reference signal in response to said error signal.

7. Apparatus for correcting effects of angular errors in a chrominance video signal accompanied by a reference signal affected by said angular errors, comprising phase-lock loop means having input means for receiving said chrominance video signal and said reference signal, and output means, and including in combination:

means connected between said input means and said output means for processing said chrominance video signal including said reference signal to dispose modulation components of said chrominance video signal about a substantially stable carrier while substantially retaining phase and amplitude interrelationships of said modulation components; means for applying said processed chrominance video signal to said output means;

means connected to said processing means for separating the processed reference signal from the processed chrominance video signal;

means connected to said separating means for deriving from said separated processed reference signal an error signal indicative of angular errors in said processed chrominance video signal; and means connected between said error signal-deriving means and said processing means for controlling said processing means in response to said error signal to correct effects of said angular errors.

8. Apparatus as claimed in claim 7, wherein said reference signal comprises color synchronization bursts, and wherein:

said signal processing means are constructed to process said chrominance video signal including said color synchronization bursts;

said error signal-deriving means include means for deriving said error signal from said separated processed color synchronization bursts in said processed chrominance video signal.

9. Apparatus as claimed in claim 7, wherein:

said processing means include modulator means having a modulating signal input connected to said input means, a further input in said phase-lock loop means for a further reference signal, and an output in said phase-lock loop means, and filter means connected between said modulator output and said output means of said phase-lock loop means for extracting said modulation components of said processed radio frequency signal from said modulator output; and said means for controlling said processing means include phase-controlled reference generator means connected to said further modulator input and said error signal-deriving means for providing said further reference signal for said modulator means and for controlling the phase of said further reference signal in response to said error signal.

10. Apparatus as claimed in claim 9, wherein said error signal-deriving means include means for providing a stable reference signal, and means connected in said phase-lock loop means between said output means of said phase-lock loop means and said phase-controlled reference signal generator means, and connected to said stable reference signal providing means for detecting phase differences between said separated processed reference signal and said stable reference signal.

11. Apparatus for correcting effects of angular errors in a video signal including luminance information and chrominance information accompanied by a reference signal affected by said angular errors, comprising in combination:

means for deriving from said video signal and said reference signal a first signal component including luminance information within a first frequency spectrum, and a second signal component including chrominance information and luminance information within a second frequency spectrum and including said reference signal;

means for processing said second signal component including said reference signal to dispose modulation components including said chrominance information and said luminance information in said second signal component about a substantially stable carrier;

means connected to said processing means for separating the processed reference signal from the processed chrominance and luminance information;

means connected to said separating means for deriving from said separated processed reference signal an error signal indicative of angular errors in said processed video signal component;

means connected to said processing means for controlling said processing means in response to said error signal to correct effects of said angular errors; and means for recombining said first signal component and said processed second signal component into a composite video signal.

12. Apparatus as claimed in claim 11, including means connected between said processing means and said recombining means for inverting the spectrum of said luminance information in said processed second video signal component.

13. Apparatus as claimed in claim 11, wherein said reference signal comprises color synchronization bursts, and wherein:

said signal component deriving means include means for deriving said first signal component and a second signal component including said chrominance information and luminance information within a second frequency spectrum and including said color synchronization bursts;

said signal processing means are constructed to process said second signal component including said color synchronization bursts;

said separating means include means for separating the processed color synchronization bursts from the processed chrominance and luminance information; and said error signal-deriving means include means for deriving said error signal from said separated color synchronization bursts.

14. Apparatus as claimed in claim 11, wherein said separating means are connected to said processing means by way of said recombining means for separating the processed reference signal from said recombined composite video signal.

15. Apparatus as claimed in claim 12, wherein said reference signal comprises color synchronization bursts, and wherein:

said signal component deriving means include means for deriving said first signal component and a second signal component including said chrominance information and luminance information within a second frequency spectrum and including said color synchronization bursts;

said signal processing means are constructed to process said second signal component including said color synchronization bursts;

said separating means include means connected to said processing means by way of said recombining means for separating the processed color synchronization bursts from said recombined composite video signal; and said error signal-deriving means include means for deriving said error signal from said separated color synchronization bursts.

16. Apparatus as claimed in claim 11, wherein said processing means, said separating means, said error signal-deriving means and said controlling means are connected in a phase-lock loop.

17. Apparatus as claimed in claim 1, wherein:

said error signal-deriving means include means for providing a stable reference signal, and means connected to said separating means and said stable reference signal providing means for deriving said error signal from said separated processed reference signal and from said stable reference signal.

18. Apparatus as claimed in claim 1, wherein:

said error signal-deriving means include means for providing a stable reference signal, means connected to said separating means and said stable reference signal providing means for providing a phase error signal by comparing said separated processed reference signal and said stable reference signal;

said controlling means include means connected to said comparing means for providing a further reference signal including a stable frequency component and a variable component varying in phase in response to said phase error signal; and said processing means include means for processing said chrominance video signal including said reference signal with the aid of said further reference signal including said stable frequency component and said variable frequency component.

* * * * *